US012607905B2

(12) United States Patent

Karle

(10) Patent No.: US 12,607,905 B2

(45) Date of Patent: Apr. 21, 2026

(54) BOOK-LIGHT AND METHOD OF OPERATING THE SAME

(71) Applicant: Stefan Karle, Munich (DE)

(72) Inventor: Stefan Karle, Munich (DE)

( * ) Notice: Subject to any disclaimer, the term of this patent is extended or adjusted under 35 U.S.C. 154(b) by 0 days.

(21) Appl. No.: 19/053,029

(22) Filed: Feb. 13, 2025

(65) Prior Publication Data

US 2025/0258422 A1 Aug. 14, 2025

(30) Foreign Application Priority Data

Feb. 14, 2024 (DE) .......................... 102024104164.1

(51) Int. Cl.
*G03B 15/05* (2021.01)

(52) U.S. Cl.
CPC ...... *G03B 15/05* (2013.01); *G03B 2215/0521* (2013.01); *G03B 2215/0535* (2013.01); *G03B 2215/0567* (2013.01)

(58) Field of Classification Search
CPC ............ G03B 15/05; G03B 2215/0521; G03B 2215/0535; G03B 2215/0567
See application file for complete search history.

(56) References Cited

U.S. PATENT DOCUMENTS 7,942,533 B2 5/2011 Ganzevoort
8,313,203 B1 * 11/2012 Guiney .................. G03B 15/02
362/18

(Continued)

FOREIGN PATENT DOCUMENTS

CN 106814521 A 6/2017
CN 215297908 U 12/2021

(Continued)

OTHER PUBLICATIONS

German Office Action, with English maschine translation thereof, for corresponding DE application No. 10 2024 104 164.1 dated Oct. 7, 2024.

(Continued)

*Primary Examiner* — Christopher E Dunay
(74) *Attorney, Agent, or Firm* — Butzel Long

(57) ABSTRACT

A book-light for illuminating photo and film scenes with soft illumination light, comprising: a three-dimensional structure having a rectangular first face and a rectangular second face; wherein the rectangular first face is configured for attachment of a lamp, and wherein the first face includes a first edge and a second edge opposite the first edge; wherein the rectangular second face includes a first edge extending adjacent to the first edge of the first face and along the first edge of the first face, and a second edge opposite the first edge, and wherein an inner surface of the second face is provided by a material that is configured to diffusely reflect light incident on the inner surface of the second face; and wherein the book-light further comprises at least one inflatable tube extending between the second edge of the first face and the second edge of the second face and which, in its inflated state, holds the second edge of the first face at a distance from the second edge of the second face, so that light reflected from the inner surface of the second face can leave the book-light between the second edge of the first face and the second edge of the second face.

21 Claims, 6 Drawing Sheets

(56) References Cited

U.S. PATENT DOCUMENTS

| | | | |
|---|---|---|---|
| 8,769,881 B2 | 7/2014 | Sebastian | |
| 2011/0170276 A1 | 7/2011 | Astill | |
| 2012/0080154 A1 | 4/2012 | O'Farrill Haro | |
| 2021/0094470 A1* | 4/2021 | Kim | G09F 13/005 |
| 2023/0341759 A1* | 10/2023 | Pineau | G03B 21/585 |
| 2023/0366524 A1* | 11/2023 | Sewell | G05D 7/0641 |
| 2024/0315477 A1* | 9/2024 | Couch | A63H 27/10 |
| 2024/0401769 A1* | 12/2024 | Matuschek | F21V 17/10 |

FOREIGN PATENT DOCUMENTS

| | | | |
|---|---|---|---|
| DE | 3443840 A1 | 6/1986 | |
| FR | 3047297 B1 | 5/2019 | |
| JP | S608936 U | 1/1985 | |
| JP | 2019152767 A | 9/2019 | |

OTHER PUBLICATIONS

Office Action from UK IPO for corresponding UK application No. 2502257.5 dated Jul. 24, 2025.

Crimson Engine, "Swiss Frame Book Light", https://www.youtube.com/watch?v=nVvYcYvoAio, (pp. 1-5).

Droi Media, "Tutorial: DIY Book Light (for under $7)", https://www.youtube.com/watch?v=qA4pHcZZlyw, (pp. 1-4).

Troy Mairs, "I've never loved a Soft Light more . . . ", https://www.youtube.com/watch?v=d5xZr47ONr8, (pp. 1-5).

Josh White, "How to build a Booklight with One C-Stand", https://www.youtube.com/watch?v=6Q4Fei84gRo, (pp. 1-5).

* cited by examiner

BOOK-LIGHT AND METHOD OF OPERATING THE SAME

CROSS-REFERENCE TO RELATED APPLICATION

This application claims benefit under 35 U.S.C. § 119 to German Application No. 10 2024 104 164.1, filed Feb. 14, 2024. The contents of this application is hereby incorporated by reference in its entirety.

FIELD

The present invention relates to a book-light and a method of operating the same.

BACKGROUND

The illumination of objects to be filmed or photographed plays an important role in the production of films and photographs. Producers use illumination as stylistic means, and a great deal of effort is put into creating a desired illumination during a production. The illumination significantly contributes to the costs of the production.

In some situations, it is desirable to illuminate a filmed or photographed object with soft light, while in other situations it is desirable to illuminate the object with hard light. For example, for illumination with hard light, the light produced by a lamp or spotlight can be directed onto the object directly, so that shadows are clearly visible on the object's structures. Illumination with soft light, on the other hand, involves illuminating the object with diffuse light, which is created indirectly, for example, by scattering light generated by a light source.

Illumination with soft light is achieved, for example, by using so-called softboxes, in which a light source can be arranged within a funnel-shaped reflector whose front opening is closed with a translucent, light-diffusing material, such as a cloth. Some of the light produced by the light source is reflected by the reflector, hitting the translucent material and passing through it, wherein the light is scattered in different directions and is thus made more diffuse. Another part of the light produced by the light source hits the translucent material directly and passes through it, wherein the light is also scattered in different directions to create diffuse light. Due to the scattering in the translucent material and due to the size of the surface of the translucent material closing the reflector, the diffuse illumination light hits the illuminated object from many different directions, thus avoiding harsh shadows and creating a softer illuminated image. In addition to a softbox, soft light can also be created with a so-called book-light, which, according to some producers, makes it possible to create even softer light. While the light generated by the light source can hit the translucent, diffusely scattering material directly in the case of a softbox, this is avoided with a book-light. With a book-light, essentially all of the light that reaches the object to be illuminated is reflected by a diffusely reflective surface. Accordingly, a conventional book-light comprises a light source that illuminates a diffusely reflective surface, such as a white cloth. The light reflected from the diffusely reflective surface can then be used to directly illuminate the object to be illuminated, or a material that is translucent and diffusely scatters light, such as another white cloth, is placed between the diffusely reflective surface and the object to be illuminated.

Conventionally, separate stands are used to hold the lamp, the diffusely reflective cloth and, if necessary, the translucently diffusely scattering cloth in a desired geometric relationship relative to each other and relative to the object to be illuminated. In this case, it is difficult to make changes to the lighting situation, since the two or three stands have to be moved individually and, in particular, stands that hold large cloths have two legs which have to be moved independently without knocking the stands over.

SUMMARY

It is an object of the present invention to provide a book-light for illuminating photo and film scenes with soft light, which is comparatively easy to operate.

According to embodiments of the invention, a book-light comprises a three-dimensional structure having a rectangular first face and a rectangular second face for reflecting light generated by the lamp. The rectangular first face is configured for attachment of a lamp and includes a first edge and a second edge opposite the first edge, so that the first and second edges extend substantially parallel to each other. Likewise, the rectangular second face includes a first edge extending adjacent to the first edge of the first face and along the first edge of the first face and a second edge opposite the first edge, so that the first and second edges of the second face extend substantially parallel to each other. An inner surface of the second face is provided by a material that is configured to diffusely reflect light incident on the inner surface of the second face. Furthermore, the book-light comprises at least one inflatable tube extending between the second edge of the first face and the second edge of the second face and which, in its inflated state, holds the second edge of the first face at a distance from the second edge of the second face, so that light reflected from the inner surface of the second face can leave the book-light between the second edge of the first face and the second edge of the second face.

In this structure, when a lamp is attached to the first face of the book-light, light emitted by the lamp can hit the inner surface of the second face. The inner surface of the second face can be provided by a material that is configured to diffusely reflect light. The light diffusely reflected on the inner surface of the second face can then pass through a third face of the book-light to leave the book-light between the second edge of the first face and the second edge of the second face and illuminate an object. In this configuration of the three-dimensional structure of the book-light, the light leaving the book-light through the third face contains essentially no light that was generated by the lamp and not reflected on the inner surface of the second face. In other words, with the book-light according to exemplary embodiments, essentially no light emitted by the lamp hits the third face directly. Since only light diffusely reflected on the inner surface of the second face can leave the book-light through the third face, the emitted light is particularly diffuse and can serve as soft light for illuminating photo and film scenes.

According to exemplary embodiments, the book-light further comprises at least one inflatable tube that extends between the second edge of the first face and the second edge of the second face and that, in its inflated state, holds the second edge of the first face at a distance from the second edge of the second face, so that light reflected from the inner surface of the second face can leave the book-light between the second edge of the first face and the second edge of the second face.

Thus, the geometric relationship between the first face and the second face of the book-light is reproducibly defined by the at least one tube in its inflated state. The first face and the second face are part of the three-dimensional structure so that for positioning this structure only one stand is necessary, which carries the lamp together with the three-dimensional structure attached to the lamp or the three-dimensional structure with the lamp attached to it. The book-light is therefore easy to position in relation to the object to be illuminated. Furthermore, the attachment and removal of the book-light is extremely simple, since the at least one tube, which in its inflated state defines the geometric relationship between the first face and the second face, can be quickly inflated using an air pump. Deflating the air from the tube causes the three-dimensional structure to fold or to collapse, and it can then be easily folded and/or rolled up. Even in a demounted state, the first face and the second face can remain connected to each other and be stored together, so that it is not necessary to join several parts to form the book-light when assembling it.

According to exemplary embodiments, a method of operating a book-light comprises withdrawing the book-light from a transport bag; inflating a tube of the book-light with air using an air pump; attaching a lamp on a first face of the book-light; illuminating an inner surface of a second face of the book-light with light from the lamp; illuminating an object with light from the lamp, wherein the light is reflected on the second face of the book-light and leaving the book-light through a third face of the book-light; photographing or filming the object while it is illuminated with light exiting the book-light; removing the lamp from the book-light; releasing the air from the tube; folding and/or rolling up the book-light; and storing the folded and/or rolled up book-light into the transport bag.

The inflatable tube is made of a flexible material so that, when it contains no air, it can be easily folded and/or rolled up. However, when the inflatable tube is inflated, it provides rigidity so that, as a component of the three-dimensional structure, it is able to maintain the distance between the second edge of the first face and the second edge of the second face and reproducibly adjust the intended geometric relationship between the first face and the second face.

According to exemplary embodiments, the tube is configured to maintain a pressure in the tube of at least 0.1 bar above atmosphere, and in particular at least 0.2 bar above atmosphere for at least one hour. This means that the tube is sufficiently hermetic when the valve is closed to maintain the internal pressure so that the tube is sufficiently rigid to maintain the geometric relationships of the three-dimensional structure. The hose of a hand-operated or electric motor-driven air pump can be connected to the valve in order to fill the tube with air and to develop the pressure above atmosphere therein. After removing the hose and closing the valve, the pressure above atmosphere remains in the tube. The air can also be let out from the inside of the tube via the valve to fold or collapse the book-light.

According to exemplary embodiments, the at least one tube, in its inflated state, has a diameter of more than 20 mm, more than 35 mm or more than 50 mm to provide sufficient rigidity in the inflated state.

The at least one tube can comprise a single continuous tube to maintain the geometric relationship between the faces of the three-dimensional structure. However, the at least one tube may also comprise a plurality of parts, i.e. tubes that are separate from one another and not formed from a single continuous tube. The plurality of tubes may be inflated independently of one another, or they may be connected to one another by means of one or more hoses, so that the tubes communicate with one another via the one or more hoses and can be inflated together. The at least one tube may comprise rectilinearly extending portions and curved portions.

According to exemplary embodiments, the at least one tube extends rectilinearly between the second edge of the first face and the second edge of the second face.

According to exemplary embodiments, the at least one tube includes a portion extending between a first end of the second edge of the first face and a first end of the second edge of the second face and includes another portion extending between a second end of the second edge of the first face and a second end of the second edge of the second face. The two portions of the at least one tube may extend rectilinearly directly between the first end of the second edge of the first face and the first end of the second edge of the second face, or they may each be differently shaped and include curved portions to maintain the distance between the second edge of the first face and the second edge of the second face.

A portion of the at least one tube can extend rectilinearly between a first end of the second edge of the first face and a second end of the second edge of the first face, wherein the second end of the second edge of the first face is opposite the first end of the second edge of the first face. Likewise, a portion of the at least one tube can extend rectilinearly between a first end of the second edge of the second face and a second end of the second edge of the second face, wherein the second end of the second edge of the second face is opposite the first end of the second edge of the second face.

According to exemplary embodiments, the first face comprises an inflatable cushion which, like the at least one tube, provides a rigid structure in the inflated state and can be folded and/or rolled up in the deflated state. Accordingly, the cushion is configured to maintain a pressure therein of at least 0.1 bar above atmosphere and in particular at least 0.2 bar above atmosphere for at least one hour.

In the inflated state, the cushion provides sufficient rigidity of the first face so that the lamp can be attached to the first face.

According to exemplary embodiments, the inflated cushion is transparent so that the light generated by the lamp can pass through. Therefore, the lamp can be attached to the outside of the cushion or the cushion can be placed on the lamp, and the light emitted by the lamp can pass through the cushion into the inside of the book-light and hit the diffusely reflective material on the inner surface of the second face.

According to exemplary embodiments the three-dimensional structure has a rectangular third face which extends between the second edge of the first face and the second edge of the second face.

The rectangular third face of the book-light, which extends between the second edge of the first face and the second edge of the second face, can be open and free of material, so that the light reflected from the second face can leave the third face without hindrance. Alternatively, the third face can be provided by a transparent material configured to diffuse light reflected from the second face and leave the book-light through the third face, so that the emitted light is scattered to enhance diffusion.

A part of the at least one tube can completely surround the third face and, for example, form a rectangular frame for the third face.

Likewise, a portion of the at least one tube can completely surround the second face and form a rectangular frame for the second face.

According to exemplary embodiments, the at least one tube comprises a first portion that extends rectilinearly along the second edge of the second face and a second portion that extends rectilinearly along an edge of the third face adjacent to the first portion of the at least one tube and along the first portion of the at least one tube.

According to exemplary embodiments, the first face comprises a light-absorbing material configured to block light that could otherwise exit the book-light through the first face. Likewise, the second face comprises a light-absorbing material configured to block light that could otherwise exit the book-light through the second face. Therefore, the light that is to illuminate the object leaves the book-light only through the third face. This avoids light exiting through the first face or the second face, which could interfere with the illumination of the object.

According to exemplary embodiments, the three-dimensional structure is configured such that a ratio between a distance between the first and the second edge of the second face and a distance between the first and the second edge of the first face is greater than 1.1, in particular greater than 1.2 and in particular greater than 1.3.

According to exemplary embodiments, the book-light further comprises two triangular faces, each having a first edge extending between the first edge and the second edge of the first face and each having a second edge extending between the first edge and the second edge of the second face, wherein the two triangular faces each include a light-absorbing material configured to block light that might otherwise exit the book-light through the triangular faces. This further avoids the emission of light from the book-light that can interfere with the illumination of the object.

BRIEF DESCRIPTION OF THE DRAWINGS

Embodiments of the disclosure are explained in greater detail below with reference to figures, in which.

DETAILED DESCRIPTION

Figure 1:
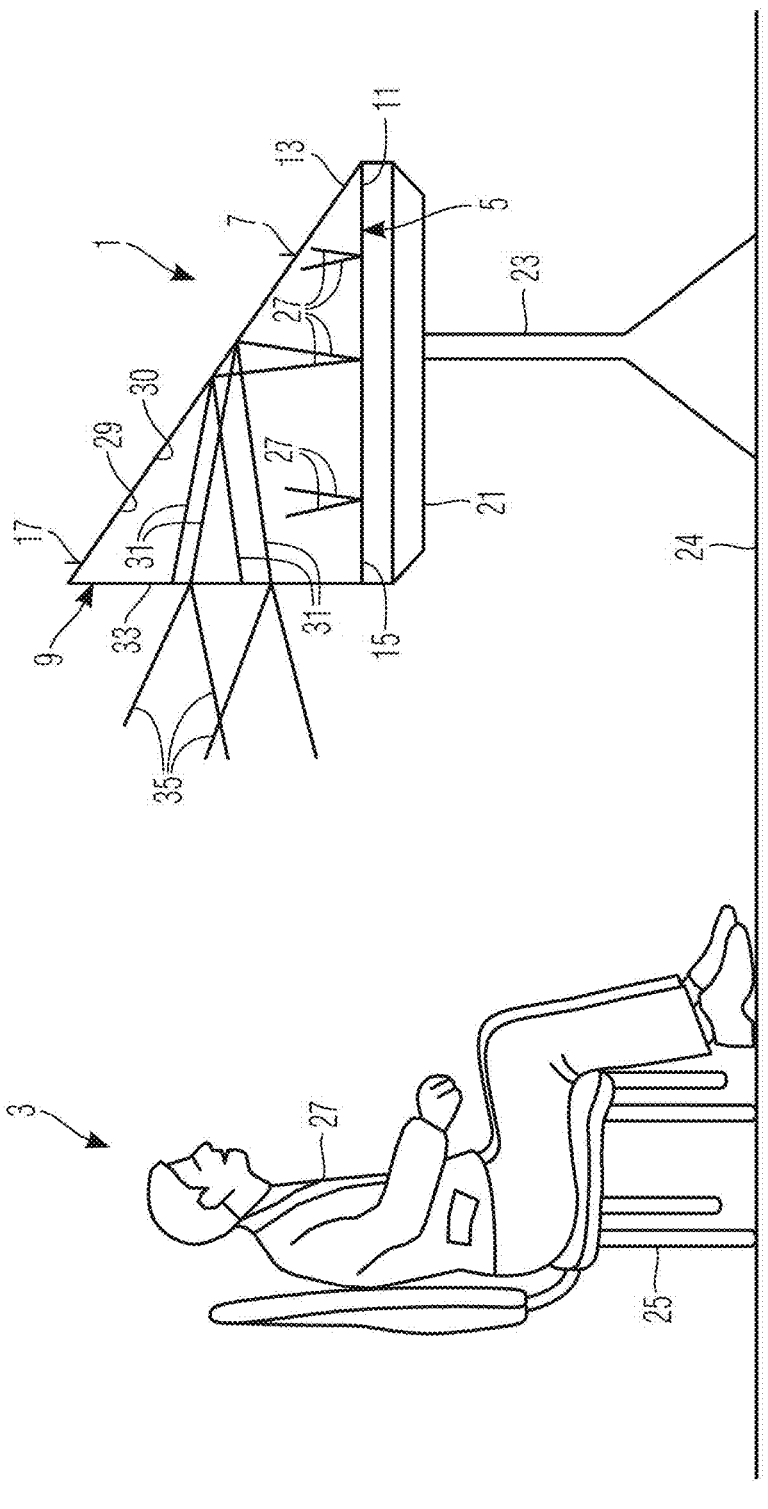
FIG. 1 shows a schematic representation of a book-light according to an embodiment for explaining its function in illuminating an object.

FIG. 1 schematically shows a cross-section of a book-light 1 for illuminating an object 3 to be photographed. The book-light 1 comprises a first face 5, a second face 7 and a third face 9. The first, second and third faces 5, 7, 9 are each rectangular and form a triangle in the cross-section of FIG. 1. A first edge 11 of the first face 5 and a first edge 13 of the second face 7 abut one another, or are arranged close together, so that they form one vertex of the triangle in the schematic representation of FIG. 1. A second edge 15 of the first face 5 and a second edge 17 of the second face 7 are arranged at a distance from each other, so that the third face 9 extends between them.

A lamp 21 is attached to the first face 5 and is fixed to a stand 23. The stand 23 stands on a floor 24 of a room, on which there is also a chair 25, on which a person 27 sits, who is the object 3 to be illuminated. By attaching the lamp 21 to the first face 5 of the book-light 1, the book-light 1 is also supported by the stand 23.

The lamp 21 includes a light source, such as a plurality of LEDs, which emit light upwards in FIG. 1. According to an example, the lamp 21 includes an array of LEDs. The number of LEDs in the lamp 21 may amount to ten or more, 30 or more, or even 100 or more. Exemplary light beams of the light emitted by the lamp 21 are shown in FIG. 1 and provided with the reference sign 27. The light 27 emitted by the lamp 21 hits an inner surface 29 of the second face 7. The inner surface 29 of the second face 7 is provided by a diffusely reflective material 30. This material 30 may, for example, be a white linen fabric sheet.

Exemplary beams of the light 27 diffusely reflected on the inner surface 29 of the second face 7 are shown in FIG. 1 and provided with the reference sign 31. The light 31 reflected on the inner surface 29 of the second face 7 hits the third face 9, where a translucent diffusely scattering material 33 is provided, which further scatters the light 31. Exemplary light beams, which are produced by scattering the light 31 at the material 33 of the third face 9, are shown in FIG. 1 and provided with the reference sign 35. The light 35 exiting the book-light 1 via the third face 9 hits the object 3 to be illuminated.

The translucent diffusely scattering material 33 can also be removed from the third face 9 so that the light 31 reflected on the inner surface 29 of the second face 7 can leave the book-light 1 without hindrance to illuminate the object 3 to be illuminated.

The first face 5 may have a length, i.e. an extent between the first edge 11 and the second edge 15, of, for example, 1000 mm. The second face 7 may have a length, i.e. an extent between the first edge 13 and the second edge 17, of, for example, 1250 mm.

Figure 2:
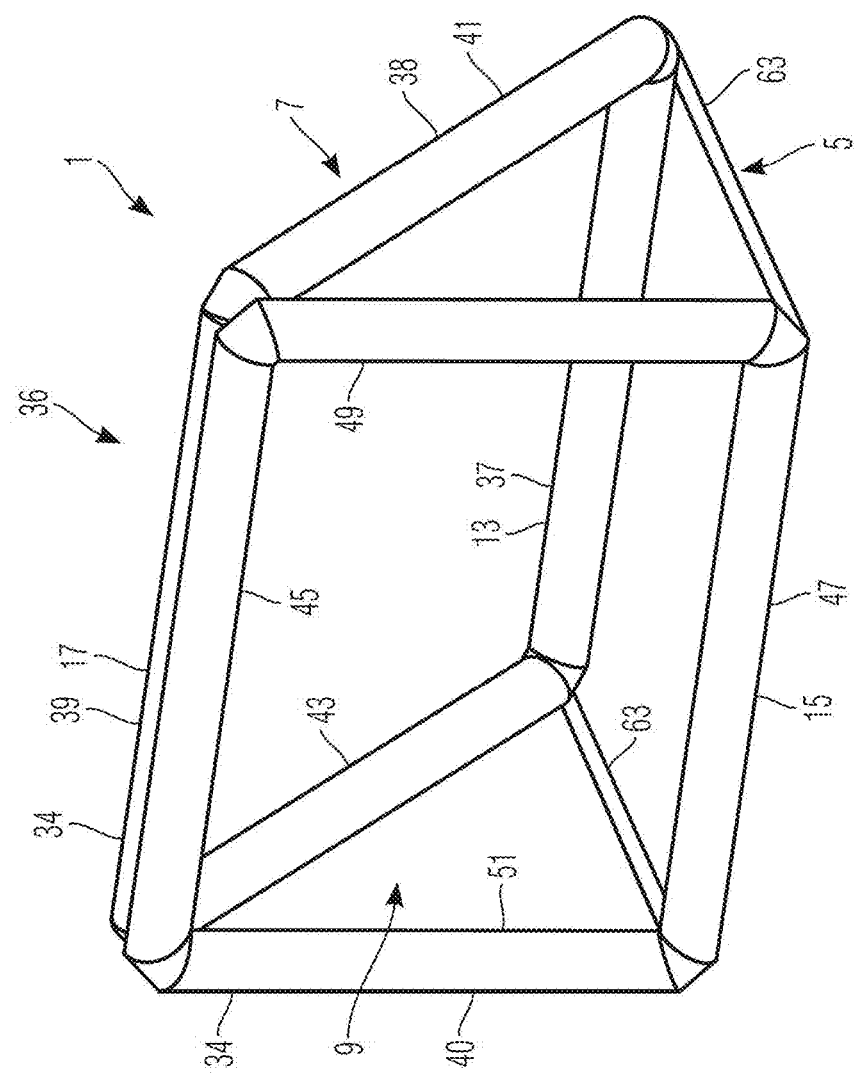
FIG. 2 shows a schematic perspective representation for explaining a three-dimensional structure of the book-light 1 shown in FIG. 1.

FIG. 2 is a schematic perspective representation for explaining a three-dimensional structure 36 of the book-light 1 shown in FIG. 1. The three-dimensional structure 36 is formed from two inflatable tubes 34.

One inflatable tube 34 forms a frame 38 on the second face 7 of the book-light 1. The tube 34 of the frame 38 comprises a portion 37 that extends along the first edge 13 of the second face 7 of the book-light 1. The tube 34 of the frame 38 further includes a portion 39 that extends along the second edge 17 of the second face 7 of the book-light 1. The tube 34 of the frame 38 further includes a portion 41 that extends between a first end of the first edge 13 and a first end of the second edge 17 of the second face 7. The tube 34 of the frame 38 further includes a portion 43 that extends between a second end of the first edge 13, wherein the second end is opposite the first end of the first edge 13, and a second end of the second edge 17 of the second face 7, wherein the second end is opposite the first end of the second edge 17. The tube 34 of the frame 38 completely surrounds the second face 7 of the book-light 1.

The other inflatable tube 34 forms a frame 40 on the third face 9 of the book-light 1. The tube 34 of the frame 40 includes a portion 45 that extends along the second edge 17 of the second face 7 of the book-light 1. The tube 34 of the frame 40 further includes a portion 47 that extends along the second edge 15 of the first face 5 of the book-light 1. The tube 34 of the frame 40 further comprises a portion 49 that extends between a first end of the second edge 15 of the first face 5 and a first end of the second edge 17 of the second face 7. The tube 34 of the frame 40 further comprises a portion 51 that extends between a second end of the second edge 15, wherein the second end is opposite the first end of the second edge 15, and a second end of the second edge 17 of the second face 7, wherein the second end is opposite the first end of the second edge 17 of the second face 7. The tube 34 of the frame 40 completely surrounds the third face 9 of the book-light 1.

Figure 3:
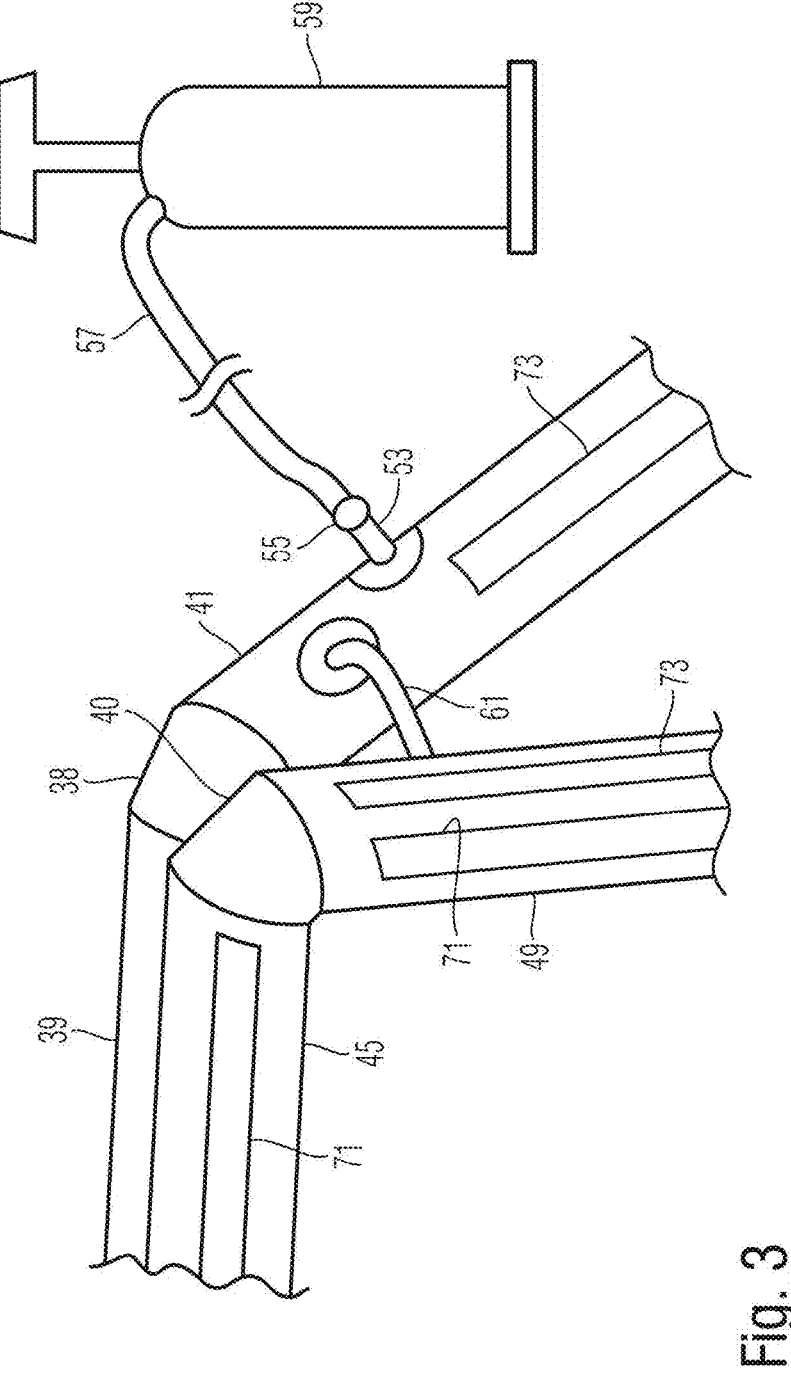
FIG. 3 shows a detail of the three-dimensional structure shown in FIG. 2 during the inflation.

FIG. 3 is a schematic representation of a detail of the three-dimensional structure shown in FIG. 2. The two frames 38 and 40 are each formed of a closed inflatable tube 34. The tubes 34 are formed, for example, from an outer hose of flexible but non-stretchable flat material, which is sewn together from several pieces in such a way that the geometric structure of the respective frame 38, 40 is formed. An inner hose made of rubber or another stretchable material is inserted into the outer hose sewn together from the flat material, wherein the inner hose is airtight and has a connecting piece 53 which passes through the outer hose made of the flat material and on which a valve 55 is provided which can close the connecting piece 53 and thus the inner hose. An air pump 59 can be connected to the valve 55 via a connecting hose 57 in order to fill the inner hose in the frame 38 with air and to generate a pressure of, for example, 0.2 bar above atmosphere in the frame 38, which provides the frame 38 with mechanical stability.

The other frame 40 is manufactured in a similar way, in that an outer hose is sewn together from several pieces of flat material, which define the geometric shape of the frame, and into which an airtight inner hose is inserted, which can be filled with air in order to generate an internal pressure of, for example, also 0.2 bar above atmosphere. For this purpose, the frame 40 can also comprise a valve on a connecting piece leading to the outside in order to connect the air pump 59 to this valve. In the example shown in FIG. 3, however, the inner airtight hoses of the two frames 38 and 40 are connected by a hose 61 via which the two inner hoses of the frames 38 and 40 communicate, so that the hoses of both frames 38 and 40 can be inflated via the one valve 55.

Reference is again made to FIG. 2. The portions 39 and 45 of the two frames 38 and 40, wherein the portions extend along the second edge of the second face 7 of the book-light 1, are connected to each other, for example, by means of hook-and-loop tapes. The two portions 37 and 47 of the two frames 38 and 40 are not directly connected to each other. However, the three-dimensional structure 36 includes two bands 63 that connect the two portions 37 and 47 and prevent a distance between the two portions 37 and 47 from exceeding a predetermined value.

FIG. 3 shows hook-and-loop tapes 71 that are attached to portions 45 and 49 of the frame 40. Corresponding hook-and-loop tapes are also attached to portions 47 and 51 of the frame 40. These hook-and-loop tapes 71 serve to fasten the translucent diffusely scattering material 33, which closes the third face 9 of the book-light 1. A hook-and-loop tape corresponding to the hook-and-loop tapes 71 is attached to the material 33 so that the material 33 can be detachably fastened to the frame 40. It is possible to keep several different such translucent diffusely scattering materials in readiness in order to influence the type of light scattering with the material and to change the character of the light emitted by the book-light 1.

The portions 37, 39, 43 and 41 of the frame 38 also have hook-and-loop tapes or the like for attaching the diffusely reflective material 30 to the second face 7 of the book-light 1.

The frames 38 and 40 also carry hook-and-loop tapes 73 for attaching light-absorbing material to the triangular faces between the both frames 38 and 40 to suppress undesirable light emission from the book-light 1.

Figure 4:
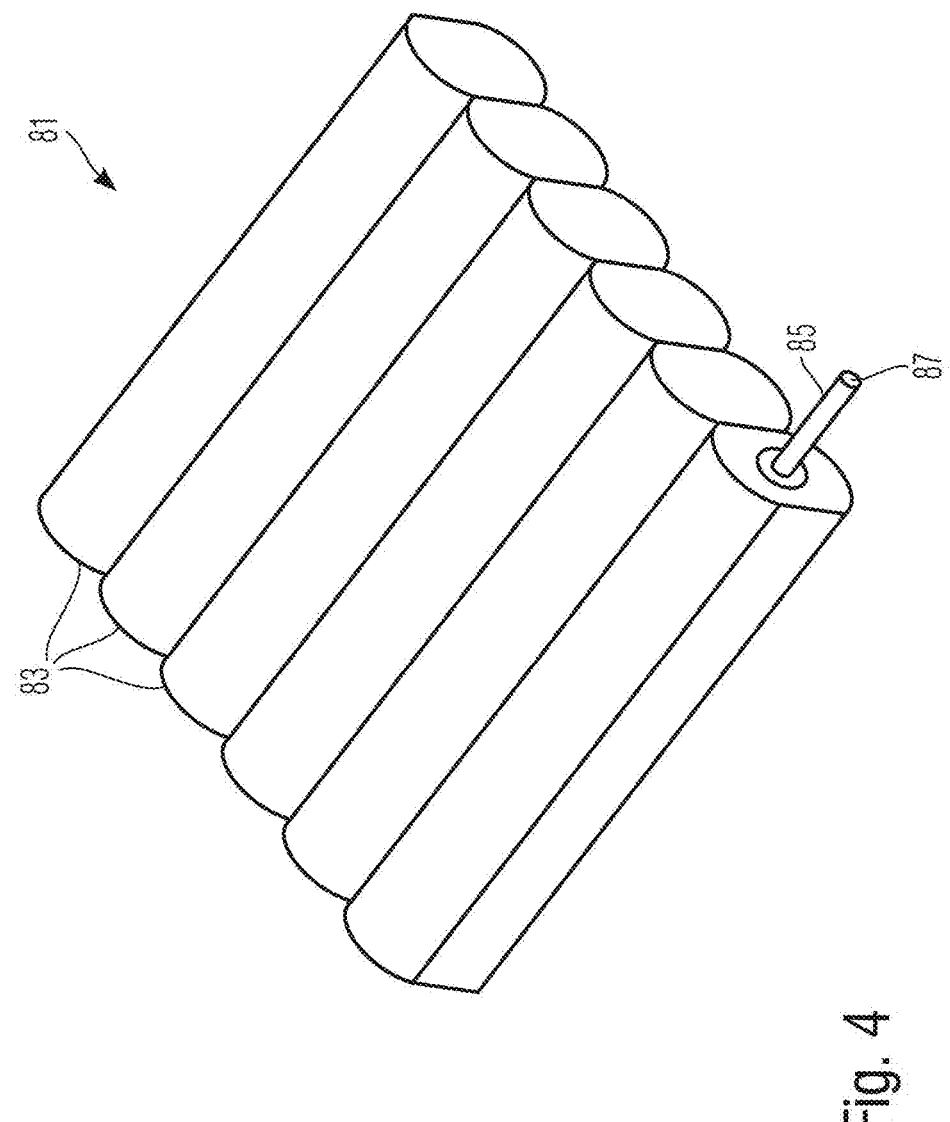
FIG. 4 shows a schematic perspective representation of an inflatable cushion of the book-light shown in FIG. 1.

FIG. 4 shows a perspective view of an inflatable cushion 81 which forms the first face 5 of the three-dimensional structure 36. The inflatable cushion 81 comprises a row of chambers 83 arranged next to one another. Each chamber 83 is formed by a hose that is connected to the hose of an adjacent chamber 83 mechanically, for example by gluing. In addition, there are ducts connections between the chambers 83 to allow air to be exchanged between the chambers 83. The cushion 81 also has a connection piece 85 with a valve 87, via which the cushion 81 can be inflated with air, for example using the pump 59.

Figure 5:
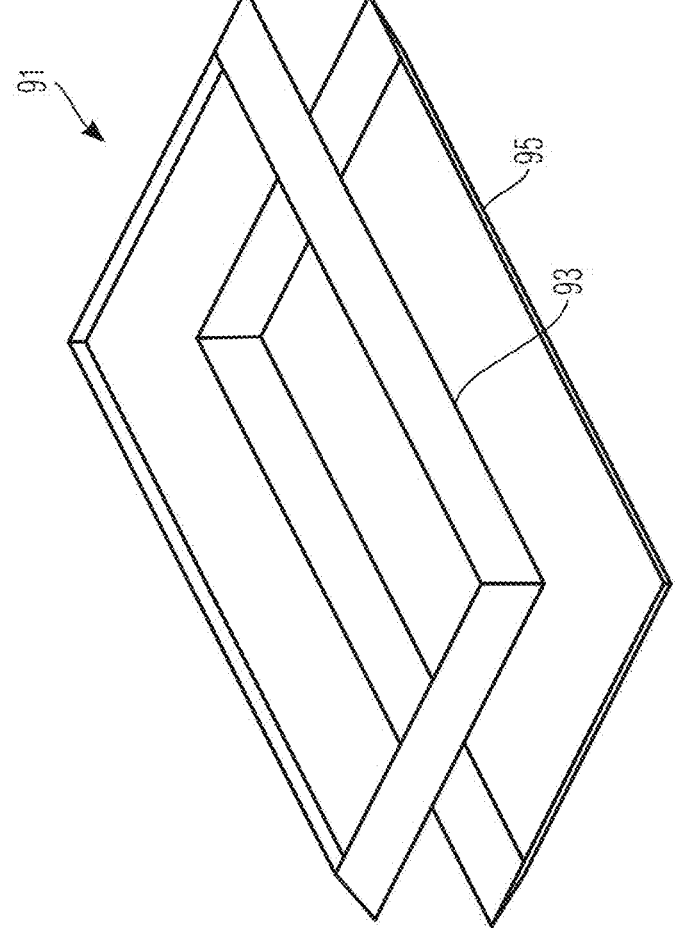
FIG. 5 shows a schematic perspective representation of a frame for the cushion shown in FIG. 4.

FIG. 5 shows a perspective view of a frame 91 having a rectangular upper portion 93 and a rectangular lower portion 95. The inflatable cushion 81 can be disposed between the upper portion 93 and the lower portion 95 of the frame 91, and the two portions 93 and 95 of the frame 91 can be connected to each other in order to surround the inflated cushion 81 at its edge. The frame 91 provides the cushion 81 with additional mechanical stability.

The upper portion 93 of the frame 91 may in turn have hook-and-loop tapes attached to it, with which the frame 91 and thus the cushion 81 can be attached to the first face 5 of the three-dimensional structure 36. For example, corresponding hook-and-loop tapes are attached to the bands 63 and to portions 47 and 37 of the frames 38 and 40. The lamp 21 can be attached properly to the lower portion 95 of the frame 91. The chambers 83 of the cushion 81 are made of transparent material so that the light generated by the lamp 21 can pass through the cushion 81 and the first face 3 of the three-dimensional structure 36 and hit the diffusely reflective material 30 on the inner surface 29 of the second face 7 of the book-light 1.

In the above-described embodiment, the three-dimensional structure 36 is formed by two frames 38 and 40, each formed by inflatable tubes 34. Thus, the above-described embodiment comprises two inflatable tubes 34 to form the three-dimensional structure 36.

Figure 6:
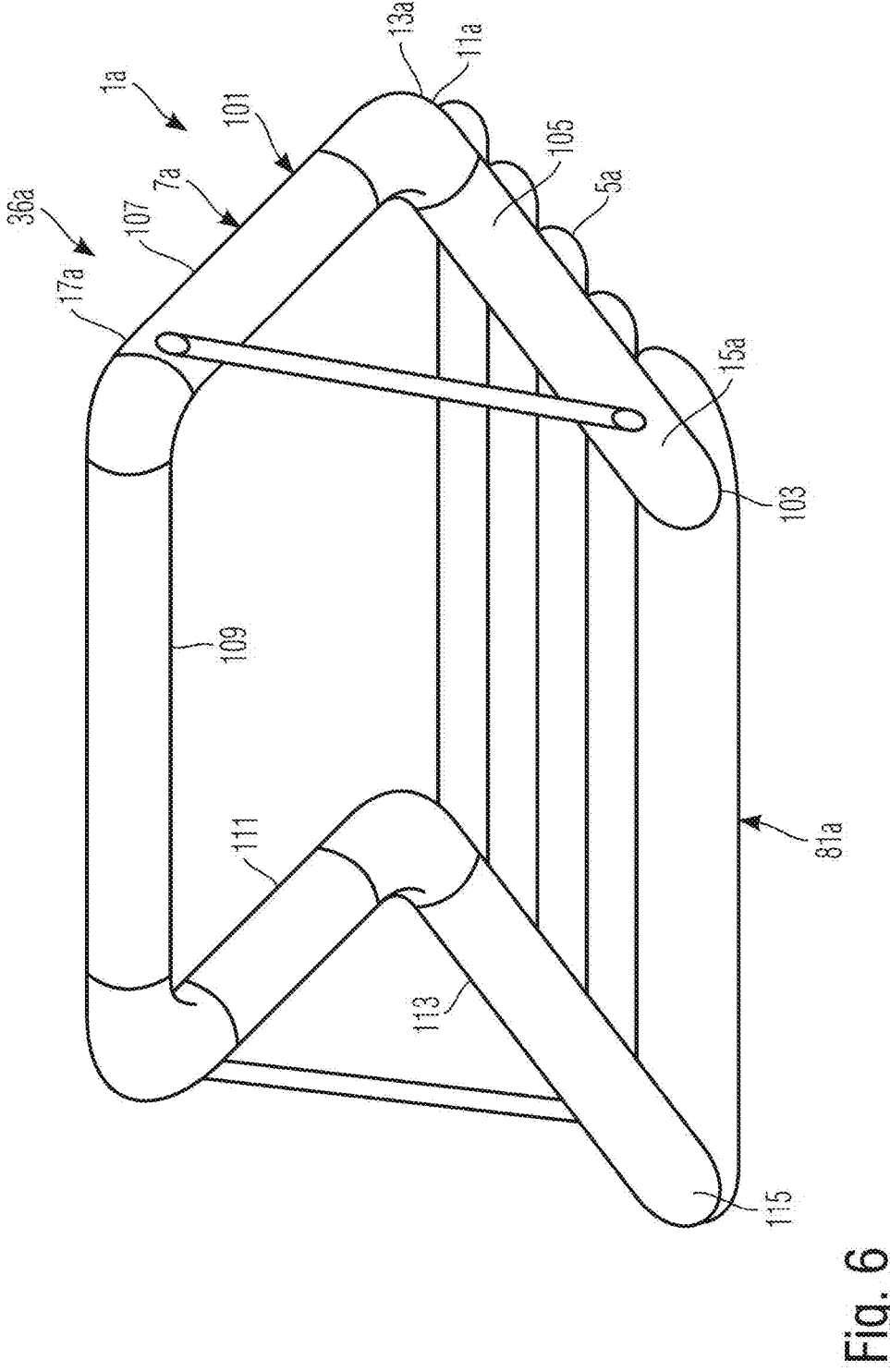
FIG. 6 shows a schematic perspective representation for explaining a three-dimensional structure of a book-light according to a further embodiment.

FIG. 6 is a perspective view of a further embodiment, in which a three-dimensional structure 36a of a book-light 1a is formed by a single inflatable tube 101. The tube 101 has one end 103 that is arranged on a second edge 15a of a first face 5a of the book-light 1a. From the first end 103, a first portion 105 of the tube 101 extends towards a first edge 11a of the first face 5a of the book-light 1a. From there, a further portion 107 of the tube 101 extends to a second edge 17a of a second face 7a of the book-light 1a. From there, a third portion 109 of the tube 101 extends along the second edge 17a of the second face 7a. A fourth portion 111 of the tube 101 then extends back to the first edge 13a of the second face 7a, and from there a fifth portion 113 of the tube 101 extends to the second edge 15a of the first face 5a of the book-light 1a, where a second end 115 of the tube 101 is arranged.

The portions 105 and 113 of tube 101 are connected to an inflatable cushion 81a, to which a lamp (not shown in FIG. 6) can be attached. The inflatable tube 101 also carries on its various portions 105 to 113 hook-and-loop tapes, to which, on the second face 7a of the book-light 1a, the light diffusely reflective material can be attached to the inner surface and light absorbing material can be attached to the outer surface. Likewise, light-absorbing material can be attached to the triangular faces spanned by the portions 105 and 107 and 111 and 113. Furthermore, a translucent and light-scattering material can be attached to the third face of the book-light 1a, which extends between the cushion 81a and the portion 109 of the tube 101.

9

The invention claimed is:

1. A book-light for illuminating photo and film scenes with soft illumination light, comprising:

a three-dimensional structure having a rectangular first face and a rectangular second face;

wherein the rectangular first face is configured for attachment of a lamp, and wherein the first face includes a first edge and a second edge opposite the first edge;

wherein the rectangular second face includes a first edge extending adjacent to the first edge of the first face and along the first edge of the first face, and a second edge opposite the first edge, and wherein an inner surface of the second face is provided by a material that is configured to diffusely reflect light incident on the inner surface of the second face;

wherein the book-light further comprises;

two inflatable tube-tubes extending between the second edge of the first face and the second edge of the second face and which, in their inflated state, hold the second edge of the first face at a distance from the second edge of the second face, so that light reflected from the inner surface of the second face can leave the book-light between the second edge of the first face and the second edge of the second face; and two triangular faces, each having a first edge extending between the first edge and the second edge of the first face and each having a second edge extending between the first edge and the second edge of the second face, wherein the two triangular faces each include a light-absorbing material configured to block light from exiting the book-light through the triangular faces.

2. The book-light according to claim 1, wherein the at least one tube is configured to maintain a pressure in the tube of at least 0.1 bar above atmosphere for at least one hour.

3. The book-light according to claim 1, wherein the at least one tube, in its inflated state, has a diameter of more than 20 mm.

4. The book-light according to claim 1, wherein the at least one tube extends rectilinearly between the second edge of the first face and the second edge of the second face.

5. The book-light according to claim 1, wherein the at least one tube extends between a first end of the second edge of the first face and a first end of the second edge of the second face;

wherein the at least one tube extends between a second end of the second edge of the first face and a second end of the second edge of the second face;

wherein the second end of the second edge of the first face is opposite the first end of the second edge of the first face; and wherein the second end of the second edge of the second face is opposite the first end of the second edge of the second face.

6. The book-light according to claim 5, wherein the at least one tube extends rectilinearly between the first end of the second edge of the first face and the first end of the second edge of the second face; and wherein the at least one tube extends rectilinearly between the second end of the second edge of the first face and the second end of the second edge of the second face.

7. The book-light according to claim 1, wherein the at least one tube extends rectilinearly between a first end of the second edge of the first face and a second end of the second edge of the first face, wherein the second end of the second edge of the first face is opposite the first end of the second edge of the first face; and wherein the at least one tube extends rectilinearly between a first end of the second edge of the second face and a second end of the second edge of the second face, wherein the second end of the second edge of the second face is opposite the first end of the second edge of the second face.

8. The book-light according to claim 1, wherein the first face includes an inflatable cushion.

9. The book-light according to claim 8, wherein the cushion is configured to maintain a pressure in the cushion of at least 0.1 bar above atmosphere for at least one hour.

10. The book-light according to claim 8, wherein the cushion is transparent.

11. The book-light according to claim 1, wherein the three-dimensional structure has a rectangular third face, wherein the rectangular third face extends between the second edge of the first face and the second edge of the second face.

12. The book-light according to claim 11, wherein the third face is open and free of material, so that light reflected from the second face can leave the third face without hindrance.

13. The book-light according to one of claim 11, wherein the third face is provided by a transparent material configured to diffuse light reflected from the second face and leave the book-light through the third face.

14. The book-light according to claim 11, wherein the at least one tube completely surrounds the third face.

15. The book-light according to claim 11, wherein the at least one tube comprises a first portion extending rectilinearly along the second edge of the second face; and wherein the at least one tube comprises a second portion extending rectilinearly along an edge of the third face adjacent to the first portion of the at least one tube and along the first portion of the at least one tube.

16. The book-light according to claim 1, wherein the at least one tube completely surrounds the second face.

17. The book-light according to claim 1, wherein the first face includes a light-absorbing material configured to block light from exiting the book-light through the first face.

18. The book-light according to claim 1, wherein the second face includes a light-absorbing material configured to block light from exiting the book-light through the second face.

19. The book-light according to claim 1, wherein a ratio between a distance between the first and the second edge of the second face and a distance between the first and the second edge of the first face is greater than 1.1.

20. The book-light according to claim 1, further comprising a lamp attached to the first face of the book-light.

21. A method of operating a book-light wherein the method comprises:

removing the book-light from a transport bag;

inflating a tube of the book-light with air using an air pump;

attaching a lamp on a first face of the book-light;

illuminating an inner surface of a second face of the book-light with light from the lamp;

illuminating an object with light from the lamp, the light being reflected from the second face of the book-light and exiting the book-light through a third face of the book-light;

photographing or filming the object while it is illuminated with the light exiting the book-light;

removing the lamp from the book-light;

releasing the air from the tube;

at least one of folding and rolling the book-light; and then storing the book-light in the transport bag.

\* \* \* \* \*